United States Patent
Chen et al.

(10) Patent No.: US 8,650,567 B2
(45) Date of Patent: Feb. 11, 2014

(54) VIRTUAL MACHINE MONITORING METHOD, SYSTEM AND COMPUTER READABLE STORAGE MEDIUM

(75) Inventors: Zhi-Wei Chen, Taipei (TW); Chia-Wei Tien, Taichung (TW); Chin-Wei Tien, New Taipei (TW); Chih-Hung Lin, New Taipei (TW)

(73) Assignee: Institute for Information Industry, Taipei (TW)

(*) Notice: Subject to any disclaimer, the term of this patent is extended or adjusted under 35 U.S.C. 154(b) by 230 days.

(21) Appl. No.: 13/287,650

(22) Filed: Nov. 2, 2011

(65) Prior Publication Data

US 2013/0067470 A1 Mar. 14, 2013

(30) Foreign Application Priority Data

Sep. 14, 2011 (TW) .............................. 100133035 A

(51) Int. Cl.
G06F 9/455 (2006.01)

(52) U.S. Cl.
USPC .............................................................. 718/1

(58) Field of Classification Search
None
See application file for complete search history.

(56) References Cited

U.S. PATENT DOCUMENTS

| | | | |
|---|---|---|---|
| 7,996,836 B1* | 8/2011 | McCorkendale et al. | 718/1 |
| 8,104,083 B1* | 1/2012 | Sobel et al. | 726/17 |
| 8,352,941 B1* | 1/2013 | Protopopov et al. | 718/1 |
| 8,387,046 B1* | 2/2013 | Montague et al. | 718/1 |
| 8,429,675 B1* | 4/2013 | Radhakrishnan et al. | 719/319 |
| 2009/0158432 A1* | 6/2009 | Zheng et al. | 726/24 |
| 2011/0145916 A1* | 6/2011 | McKenzie et al. | 726/19 |
| 2012/0054744 A1* | 3/2012 | Singh et al. | 718/1 |
| 2012/0331461 A1* | 12/2012 | Fries et al. | 718/1 |

* cited by examiner

*Primary Examiner* — Emerson Puente
*Assistant Examiner* — Adam Lee
(74) *Attorney, Agent, or Firm* — McClure, Qualey & Rodack, LLP

(57) ABSTRACT

A virtual machine monitoring method used in a virtual machine monitoring system is provided. The virtual machine monitoring method includes retrieving a hypercall transmitted from one of a plurality of virtual machines to a hypervisor of a virtual machine monitoring system, wherein the hypercall is used for establishing a channel between a source virtual machine and a target virtual machine. A central control virtual machine ID information in the hypervisor is retrieved. A type of the channel established by the hypercall is determined according to the central control virtual machine ID information and channel-establishing information corresponding to the hypercall. When the channel is a private channel that is not related to a central control virtual machine of the virtual machines, a security module is used to monitor the private channel.

18 Claims, 2 Drawing Sheets

VIRTUAL MACHINE MONITORING METHOD, SYSTEM AND COMPUTER READABLE STORAGE MEDIUM

RELATED APPLICATIONS

This application claims priority to Taiwan Application Serial Number 100133035, filed Sep. 14, 2011, which is herein incorporated by reference.

BACKGROUND

1. Technical Field

The present disclosure relates to virtual machines. More particularly, the present disclosure relates to a virtual machine monitoring method, a virtual machine monitoring system and a computer readable storage medium for storing a computer program to perform the virtual machine monitoring method.

2. Description of Related Art

In the conventional technology, only one operating system can be executed on one physical machine. The hardware resource of the physical machine thus cannot be fully utilized. In order to improve the efficiency and availability of the hardware resource and applications, a virtualization technology is used to establish a virtual environment for running multiple virtual machines on the physical machine to fully utilize the resource.

A central control virtual machine established in the virtual environment is used to manage the resources of all the virtual machines established in the same virtual environment. The communication among the virtual machines is controlled by the central control virtual machine. Accordingly, it is easy to detect abnormal data transmission by monitoring the central control virtual machine. However, in order to accelerate the communication among the virtual machines, the establishment of the private channel without the participation of the central control virtual machine is allowed in a recent technology. The conventional monitoring method thus cannot detect the unauthorized data access in the private channel.

Accordingly, there is a need to provide a virtual machine monitoring method, a virtual machine monitoring system and a computer readable storage medium to overcome the above issues. The present disclosure addresses such a need.

SUMMARY

An aspect of the present disclosure is to provide a virtual machine monitoring system. The virtual machine monitoring system comprises a hypervisor, a plurality of virtual machines, a security module and a hypercall intercept module. The virtual machines perform access to a hardware resource of at least one physical operation device through the hypervisor, wherein the virtual machines comprises a central control virtual machine used to control the virtual machines. The hypercall intercept module is established in the hypervisor for retrieving central control virtual machine ID information in the hypervisor and retrieving a hypercall transmitted from one of the virtual machines to the hypervisor, wherein the hypercall is used for establishing a channel between a source virtual machine and a target virtual machine. The hypercall intercept module further determines a type of the channel established by the hypercall according to the central control virtual machine ID information and the channel-establishing information corresponding to the hypercall, such that when the type of the channel is a private channel that is not related to the central control virtual machine, the security module is used to monitor the private channel.

Another aspect of the present disclosure is to provide a virtual machine monitoring method used in a virtual machine monitoring system. The virtual machine monitoring method comprises the steps as outlined below. A hypercall transmitted from one of a plurality of virtual machines to a hypervisor of the virtual machine monitoring system is retrieved, wherein the hypercall is used for establishing a channel between a source virtual machine and a target virtual machine. Central control virtual machine ID information in the hypervisor is retrieved. A type of the channel established by the hypercall is determined according to the central control virtual machine ID information and channel-establishing information corresponding to the hypercall. When the channel is a private channel that is not related to a central control virtual machine of the virtual machines, a security module is used to monitor the private channel.

Yet another aspect of the present disclosure is to provide a computer readable storage medium for storing a computer program to perform a virtual machine monitoring method. The virtual machine monitoring method comprises the steps as outlined below. A hypercall transmitted from one of a plurality of virtual machines to a hypervisor of the virtual machine monitoring system is retrieved, wherein the hypercall is used for establishing a channel between a source virtual machine and a target virtual machine. Central control virtual machine ID information in the hypervisor is retrieved. A type of the channel established by the hypercall is determined according to the central control virtual machine ID information and channel-establishing information corresponding to the hypercall. When the channel is a private channel that is not related to a central control virtual machine of the virtual machines, a security module is used to monitor the private channel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
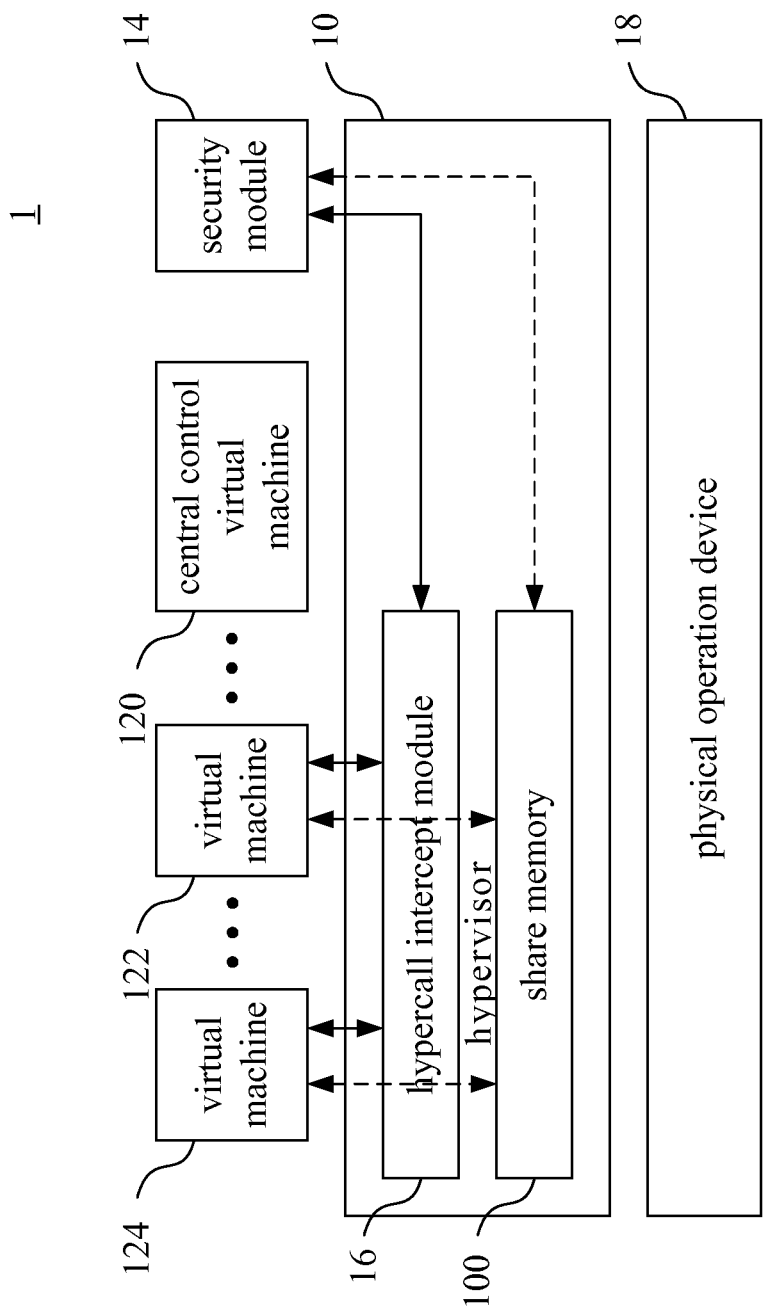
FIG. 1 is a block diagram of a virtual machine monitoring system in accordance with an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a virtual machine monitoring system 1 in accordance with an embodiment of the present disclosure. The virtual machine monitoring system 1 comprises a hypervisor 10, a plurality of virtual machines 120, 122 and 124, a security module 14 and a hypercall intercept module 16.

The virtual machine monitoring system 1 is a virtual environment established on a physical operation device 18 to generate a plurality of virtual machines on the hypervisor that are able to access the hardware resource of the physical operation device 18 through the virtual technology. For example, the virtual machine monitoring system 1 can be established on a single personal computer to generate virtual machines on the hypervisor. Different operation systems can be executed in these virtual machines. The desire to run multiple operating systems was the original motivation for virtual machines, as it allowed time-sharing a single computer between several single-tasking Operation Systems. In various embodiments, the number of the virtual machines in a virtual environment can be different.

Each of the virtual machines comprises a virtual machine ID. In an embodiment, the virtual machine ID is a domain ID of the virtual machine. For example, the virtual machine ID of the virtual machine 122 is domain 1, and the virtual machine ID of the virtual machine 124 is domain 2. In the present embodiment, the virtual machine 120 is a central control virtual machine. In different embodiments, the virtual machine 120 can be a central control virtual machine with a virtual machine ID of domain 0 or a driver domain virtual machine with a virtual machine ID different from domain 0, so as to control the communications among the virtual machines.

In general, the virtual machines 122 and 124 perform communication through the central control virtual machine 120. More specifically, the virtual machines 122 and 124 first establish a share memory in the hypervisor 10, and then perform communication through the central control virtual machine 120. If one of the virtual machines 122 and 124 wants to transmit data to the other virtual machine, it has to transmit data to the central control virtual machine 120 through the share memory first. After receiving the data, the central control virtual machine 120 further transmits the data to the target virtual machine. Consequently, the security module 14 can intercept and examine the data transmitted through the central control virtual machine 120 to prevent unauthorized data access when the communication is performed through the central-controlled channel described above. It is noted that in an embodiment, the security module 14 described above is a module which is independent of the central control virtual machine 120. In other embodiments, the security module 14 can be embedded in the central control virtual machine 120.

The communication between the virtual machines 122 and 124 can be accelerated by establishing a private channel between the virtual machines 122 and 124 directly without the participation of the central control virtual machine 120. However, the security module 14 cannot monitor the private channel through the central control virtual machine 120 since the central control virtual machine 120 is not involved in the communication between the virtual machines 122 and 124. Hence, it is difficult to detect the unauthorized data access, and thus the information security is not easy to be maintained.

The hypercall intercept module 16 of the virtual machine monitoring system 1 is established in the hypervisor 10. The hypercall intercept module 16 is able to retrieve a hypercall transmitted from one of the virtual machines to the hypervisor 10. For example, when the virtual machine 122 desires to perform communication with the virtual machine 124, a hypercall generated by the virtual machine 122 is transmitted to the hypervisor 10 through the solid line path depicted in FIG. 1 first. In the present embodiment, the source of the hypercall is the virtual machine 122 and the target of the hypercall is the virtual machine 124. Channel-establishing information is generated according to the hypercall. In an embodiment, the channel-establishing information comprises the data structures related to the event and the domain that record a source virtual machine ID and a target virtual machine ID.

TABLE 1

|  | data structure | Parameters in the data structure |
|---|---|---|
| Event-related | struct evtchn | Struct { Domain *remote_dom } interdomain |
| Domain-related | struct domain | Current->domain |

Table 1 is the content of the data structures related to the event and the domain in an embodiment of the present disclosure. The parameter "domain *remote_dom" corresponds to the source virtual machine ID, and the parameter "current->domain" corresponds to the target virtual machine ID. Accordingly, the hypercall intercept module 16 in the hypervisor can retrieve the source virtual machine ID and the target virtual machine ID from the channel-establishing information. In the present embodiment, the source virtual machine ID is domain 0 and the target virtual machine ID is domain 2.

It is noted that in other embodiment, the source virtual machine ID and the target virtual machine ID can also be recorded in another data structure different from the example mentioned above.

The hypercall intercept module 16 further retrieves central control virtual machine ID information (not shown) in the hypervisor 10. In an embodiment, the central control virtual machine ID information is recorded in a kernel map. By referring to the kernel map, the central control virtual machine ID information can be retrieved. In an embodiment, the central control virtual machine ID information is the virtual machine ID (domain 0 in the present embodiment) of the central control virtual machine. From the comparison between the central control virtual machine ID and the source/target virtual machine IDs, it is known that whether one of the source and the target virtual machines 122 and 124 is the central control virtual machine 120.

When one of the source and target virtual machines is the central control virtual machine 120, the hypercall intercept module 16 determines that the channel established according to the hypercall is a central-controlled channel. In the above example, the source virtual machine ID is domain 1, and the target virtual machine ID is domain 2. Hence, none of the source and target virtual machines is the central control virtual machine 120. The hypercall intercept module 16 determines that the channel established according to the hypercall is a private channel without the participation of the central control virtual machine 120.

After determining that the channel is the private channel, the hypercall intercept module 16 transmits the hypercall to the target virtual machine 124 and the security module 14. The hypercall then establishes share memory 100 in the hypervisor such that the virtual machines 122 and 124 can perform communication through the share memory 100. Both of the target virtual machine 124 and the security module 14 are authorized to access the share memory 100. The security module 14 can thus access and monitor the information in the private channel through the dash line path depicted in FIG. 1.

In an embodiment, the hypercall intercept module 16 retrieves a clean-up signal (not shown) from the target virtual machine 124 to the hypervisor 10 after the target virtual machine 124 finishes processing the data access request of the source virtual machine 122. After the security module 14 accesses the data in the private channel, the security module 14 will transmit a clean-up signal to the hypercall intercept module 16 as well. After receiving the clean-up signals from the target virtual machine 124 and the security module 14, the hypercall intercept module 16 informs the source virtual machine 122 to close the private channel. Hence, the above procedures ensure that the security module 14 monitors all the information exchange between the source virtual machine 122 and the target virtual machine 124.

Accordingly, the hypercall intercept module 16 of the virtual machine monitoring system 1 can retrieve the virtual machine ID and the hypercall to determine whether the channel is a private channel according to the corresponding channel-establishing information. When the channel is the private channel, the hypercall intercept module 16 can further enable the security module 14 to be authorized to access the private channel to perform monitoring.

Figure 2:
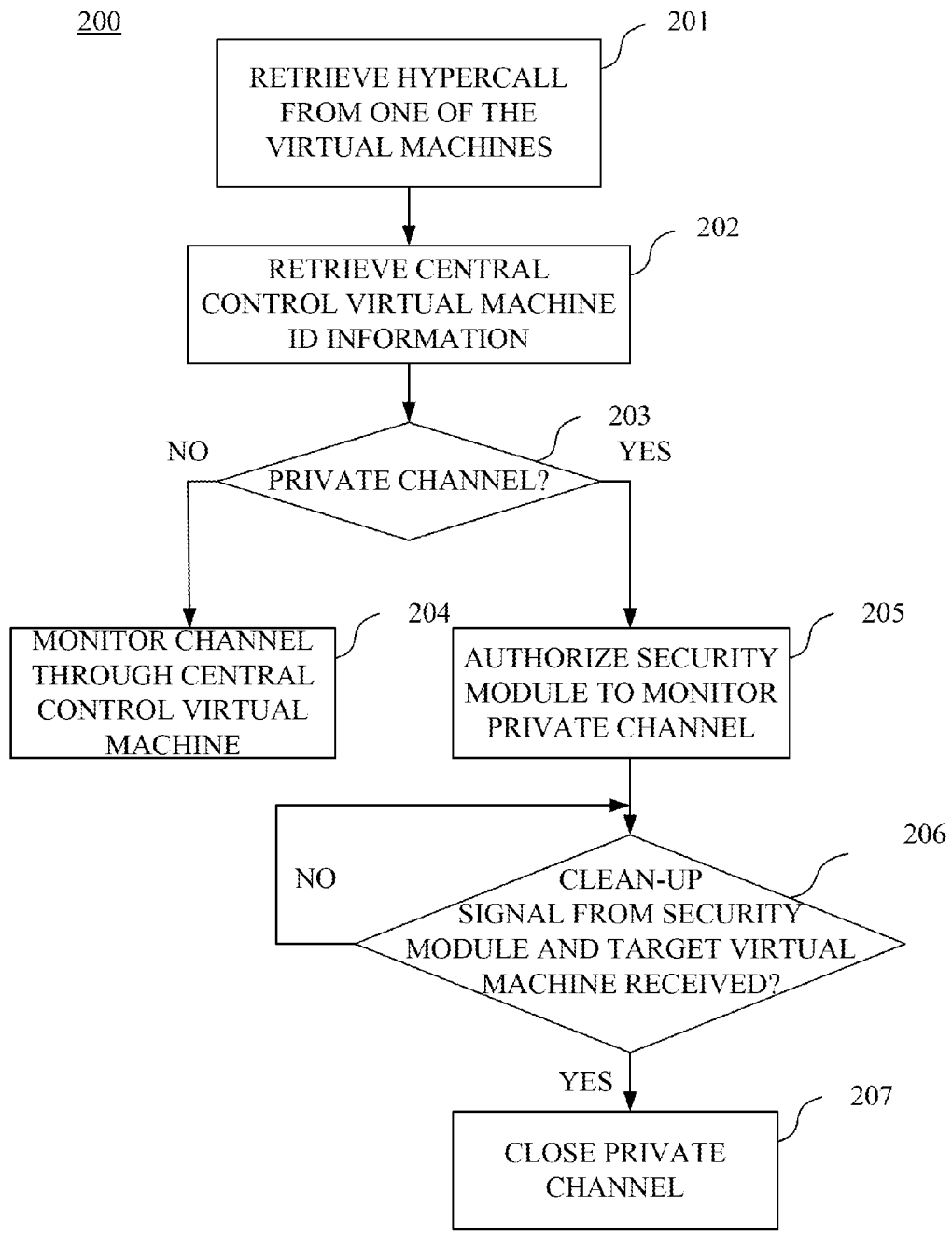
FIG. 2 is a flow chart of a virtual machine monitoring method in accordance with an embodiment of the present disclosure.

FIG. 2 is a flow chart of a virtual machine monitoring method 200 in accordance with an embodiment of the present disclosure. The virtual machine monitoring method 200 can be used in the virtual machine monitoring system 1 depicted in FIG. 1. The virtual machine monitoring method 200 can be implemented by using a computer program to control the modules in the virtual machine monitoring system 1. The computer program can be stored in a computer readable medium such as an ROM, a flash memory, a floppy disc, a hard disc, an optical disc, a flash disc, a tape, a database accessible from a network, or a storage medium with the same functionality that can be easily thought by people skilled in this field.

The virtual machine monitoring method comprises the steps as outlined below.

In step 201, a hypercall transmitted from one of the virtual machines to a hypervisor 10 of the virtual machine monitoring system 1 is retrieved by the hypercall intercept module 16, wherein the hypercall is used for establishing a channel between a source virtual machine and a target virtual machine.

In step 202, the hypercall intercept module 16 retrieves a central control virtual machine ID information in the hypervisor 10. In step 203, the hypercall intercept module 16 determines the type of the channel established by the hypercall according to the central control virtual machine ID information and channel-establishing information corresponding to the hypercall. For example, the virtual machine 120 is a central control virtual machine 120. The ID of the central control virtual machine 120 can be retrieved by referring to the kernel map. The channel-establishing information records the source virtual machine ID and the target virtual machine ID. Accordingly, the hypercall intercept module 16 can determine whether one of the source virtual machine ID and the target virtual machine ID is the ID of the central control virtual machine 120.

If one of the source virtual machine ID and the target virtual machine ID is the ID of the central control virtual machine 120, the hypercall intercept module 16 determines that the channel established by the hypercall is a central-controlled channel and enable the security module 14 to monitor the central-controlled channel through the central control virtual machine 120 in step 204. If none of the source virtual machine ID and the target virtual machine ID is the ID of the central control virtual machine 120, the hypercall intercept module 16 determines that the channel established by the hypercall is a private channel in step 205 and enable the security module 14 to be authorized to monitor the private channel. In an embodiment, the hypercall intercept module 16 transmits the hypercall to both the target virtual machine and the security module 14 such that both the target virtual machine and the security module 14 are authorized to access the private channel.

In step 206, the hypercall intercept module 16 determines whether clean-up signals is received from the target virtual machine and the security module 14 respectively. If the clean-up signal from one of the target virtual machine and the security module 14 is not received, the method proceeds back to step 206 to wait for the clean-up signal. If the clean-up signals are received from the target virtual machine and the security module 14 respectively, the hypercall intercept module 16 informs the source virtual machine to close the private channel in step 207.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer comprising:
   at least one physical operation device comprising a hardware resource; and
   a virtual machine monitoring system established on the at least one physical operation device, the virtual machine monitoring system comprising:
   a hypervisor;
   a plurality of virtual machines for performing access to the hardware resource of the at least one physical operation device through the hypervisor, wherein the virtual machines comprise a central control virtual machine used for controlling the virtual machines;
   a security module; and
   a hypercall intercept module established in the hypervisor for retrieving central control virtual machine ID information in the hypervisor and retrieving a hypercall transmitted from one of the virtual machines to the hypervisor, wherein the hypercall is used for establishing a channel between a source virtual machine and a target virtual machine;
   wherein the hypercall intercept module further determines a type of the channel established by the hypercall by determining whether source virtual machine ID information and target virtual machine ID information comprise the central control virtual machine ID information, such that when the source virtual machine ID information and the target virtual machine ID information do not include the central control virtual machine ID information, the hypercall intercept module determines that the type of the channel is a private channel, and the security module is used to monitor the channel.

2. The computer of claim 1, wherein when the source virtual machine ID information and the target virtual machine ID information include the central control virtual machine ID information, the hypercall intercept module determines that the channel is a central-controlled channel.

3. The computer of claim 1, wherein the channel is a share memory of the hypervisor.

4. The computer of claim 1, wherein the central control virtual machine ID information is retrieved by referring to a kernel map.

5. The computer of claim 1, wherein when the type of the channel is the private channel, the hypercall intercept module transmits the hypercall to the target virtual machine and the security module, such that the security module accesses data transmitted in the private channel.

6. The computer of claim 5, wherein the hypercall intercept module further informs the source virtual machine to close the private channel after receiving a clean-up signal from the target virtual machine and the security module respectively.

7. A virtual machine monitoring method used in a virtual machine monitoring system, wherein the virtual machine monitoring method comprises:
- retrieving a hypercall transmitted from one of a plurality of virtual machines to a hypervisor of the virtual machine monitoring system, wherein the hypercall is used for establishing a channel between a source virtual machine and a target virtual machine;
- retrieving central control virtual machine ID information in the hypervisor;
- determining a type of the channel established by the hypercall by determining whether source virtual machine ID information and target virtual machine ID information comprise the central control virtual machine ID information; and
- when the source virtual machine ID information and the target virtual machine ID information do not include the central control virtual machine ID information, the hypercall intercept module determines that the type of the channel is a private channel, using a security module to monitor the channel.

8. The virtual machine monitoring method of claim 7, wherein when the source virtual machine ID information and the target virtual machine ID information include the central control virtual machine ID information, the type of the channel is determined as a central-controlled channel.

9. The virtual machine monitoring method of claim 7, wherein the channel is a share memory of the hypervisor.

10. The virtual machine monitoring method of claim 7, wherein the central control virtual machine ID information is retrieved by referring to a kernel map.

11. The virtual machine monitoring method of claim 7, wherein when the type of the channel is the private channel, the step of using the security module to monitor the private channel further comprises:
- transmitting the hypercall to the target virtual machine and the security module; and
- accessing data transmitted in the private channel by the security module.

12. The virtual machine monitoring method of claim 11, further comprising:
- determining whether a clean-up signal is received from the target virtual machine and the security module respectively; and
- when the clean-up signal is received from the target virtual machine and the security module respectively, informing the source virtual machine to close the private channel.

13. A non-transitory computer readable storage medium for storing a computer program to perform a virtual machine monitoring method, wherein the virtual machine monitoring method comprises:
- retrieving a hypercall transmitted from one of a plurality of virtual machines to a hypervisor of a virtual machine monitoring system, wherein the hypercall is for establishing a channel between a source virtual machine and a target virtual machine;
- retrieving central control virtual machine ID information in the hypervisor;
- determining a type of the channel established by the hypercall by determining whether source virtual machine ID information and target virtual machine ID information comprise the central control virtual machine ID information; and
- when the source virtual machine ID information and the target virtual machine ID information do not include the central control virtual machine ID information, the hypercall intercept module determines that the type of the channel is a private channel, using a security module to monitor the channel.

14. The non-transitory computer readable storage medium of claim 13, wherein when the source virtual machine ID information and the target virtual machine ID information include the central control virtual machine ID information, the type of the channel is determined as a central-controlled channel.

15. The non-transitory computer readable storage medium of claim 13, wherein the channel is a share memory of the hypervisor.

16. The non-transitory computer readable storage medium of claim 13, wherein the central control virtual machine ID information is retrieved by referring to a kernel map.

17. The non-transitory computer readable storage medium of claim 13, wherein when the type of the channel is the private channel, the step of using the security module to monitor the private channel further comprises:
- transmitting the hypercall to the target virtual machine and the security module; and
- accessing data transmitted in the private channel by the security module.

18. The non-transitory computer readable storage medium of claim 17, further comprising:
- determining whether a clean-up signal is received from the target virtual machine and the security module respectively; and
- when the clean-up signal is received from the target virtual machine and the security module respectively, informing the source virtual machine to close the private channel.

* * * * *